Dec. 28, 1937. B. A. DIGGINS 2,103,575
GOGGLES
Filed Aug. 21, 1936

BARTHOLOMEW A. DIGGINS
INVENTOR.

ATTORNEY.

Patented Dec. 28, 1937

2,103,575

UNITED STATES PATENT OFFICE 2,103,575

GOGGLES

Bartholomew A. Diggins, Rochester, N. Y., assignor to Bausch & Lomb Optical Company, Rochester, N. Y., a corporation of New York Application August 21, 1936, Serial No. 97,237

2 Claims. (Cl. 88—41)

The present invention relates to goggles or the like and more particularly to an adjustable bridge for the same.

One of the objects of the present invention is to provide a goggle bridge which is simple and inexpensive to manufacture yet rugged and efficient in operation. Another object is to provide a goggle bridge which is both adjustable and resilient. A further object is to provide a goggle bridge which is composed of two metal helixes screwed together. These and other objects and advantages reside in certain novel features of construction, arrangement and combination of parts as will hereinafter be more fully set forth and pointed out in the appended claims.

Referring to the drawing.

Figure 1:
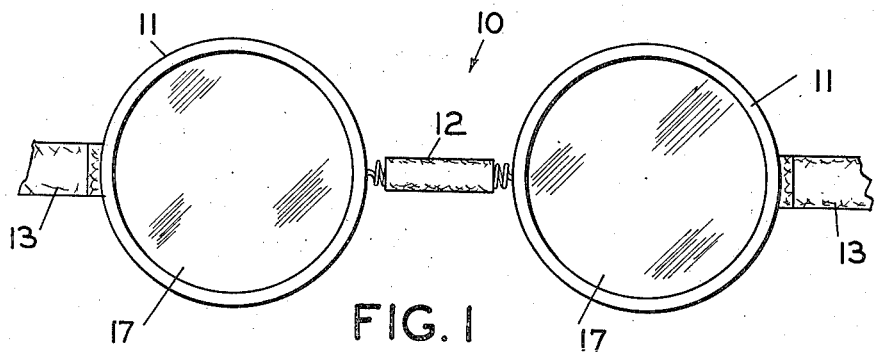
Fig. 1 is a front elevation of a pair of goggles embodying my invention.

A preferred embodiment of the present invention is illustrated in the drawing wherein 10 indicates, generally, a pair of goggles having the two eye cups 11 connected by a bridge member 12. The goggles are held on the head of the wearer by a suitable head band 13. Each eye cup 11 is provided with a threaded portion 14 upon which is threaded a rim or bezel 15 having an inward flange 16 for clamping the lens 17 in place on the front of the eye cup.

Figure 2:
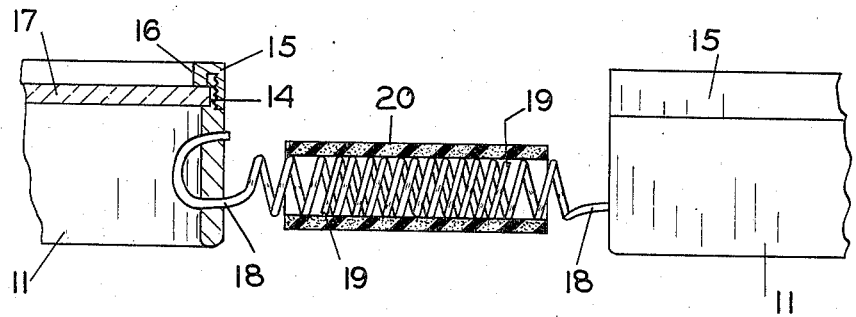
Fig. 2 is an enlarged horizontal section of the goggles with parts in elevation.

Suitably secured in the nasal wall of each eye cup 11 is a helical metal spring 18 which has a free outer end 19. The two springs 18 are screwed together as shown in Fig. 2 and the distance between the eye cups 11 can be varied by simply screwing the springs 18 in one direction or the other. Of course the helixes 18 are not necessarily metallic nor resilient, but a resilient metal spring is preferred. A suitable tube 20, of rubber or the like, snugly engages the helixes 18 and serves both to hold the helixes 18 in alignment and to form a comfortable contact for the nose of the wearer.

From the foregoing, it will be apparent that I am able to attain the objects of my invention and provide a simple, rugged and inexpensive goggle bridge which is both adjustable and resilient. Various modifications can, of course, be made without departing from the spirit of my invention or the scope of the appended claims.

I claim:

1. In a pair of goggles, a tube, two helixes screwed together within the tube and engaging the inner wall of said tube, each helix having one end extending out of said tube, and two eye cups secured one on each of said ends.

2. In a pair of goggles, a resilient tube, two metal helixes screwed together within the tube and engaging the inner wall of said tube, one helix having an end extending from one end of the tube, the other helix having one end extending from the other end of the tube, and two eye cups secured one to each of said ends.

BARTHOLOMEW A. DIGGINS.